Nov. 30, 1948.  R. M. GAMBLE  2,454,916
MACHINE TOOL
Filed Feb. 18, 1946  4 Sheets-Sheet 1
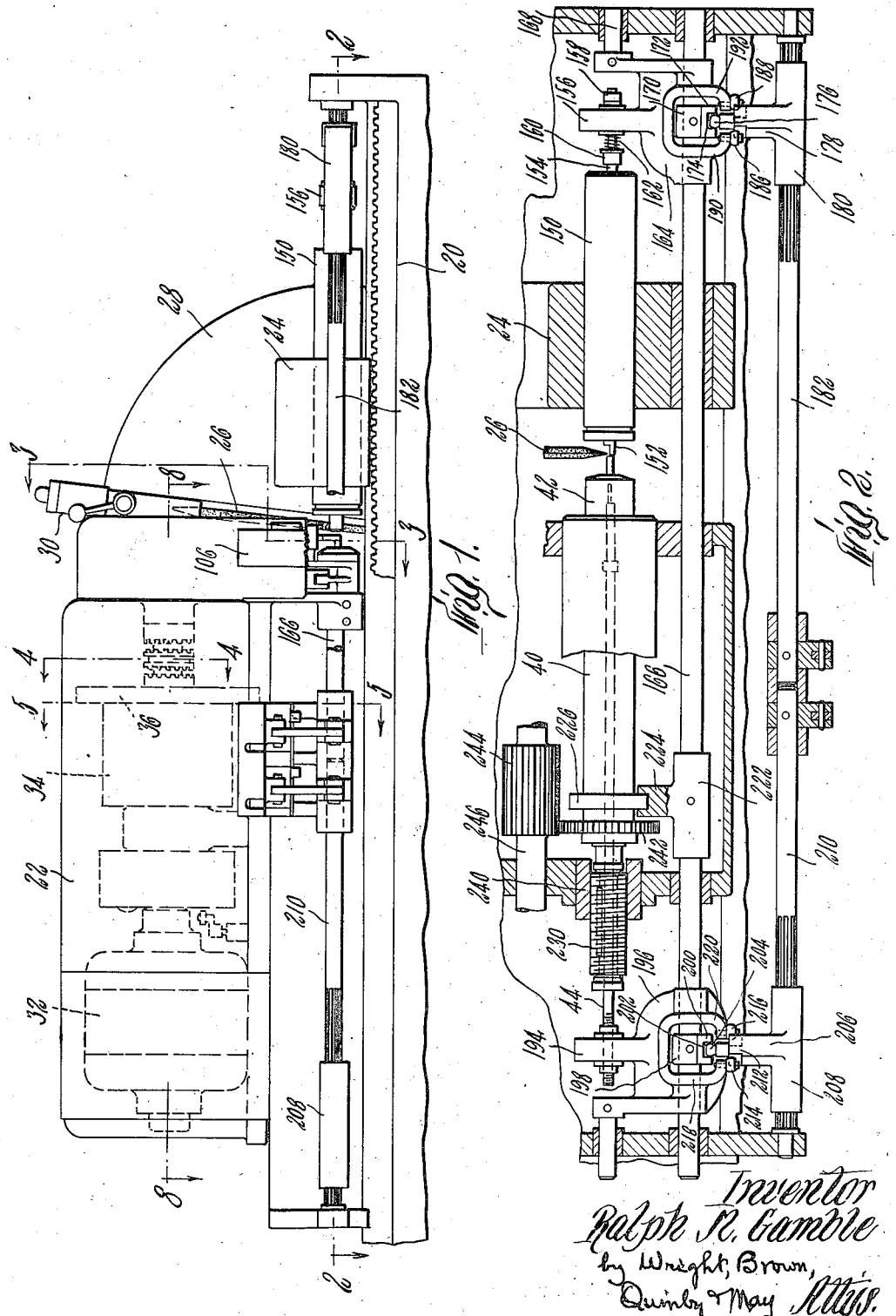
Inventor
Ralph M. Gamble
by Wright, Brown,
Quinby & May Attys.

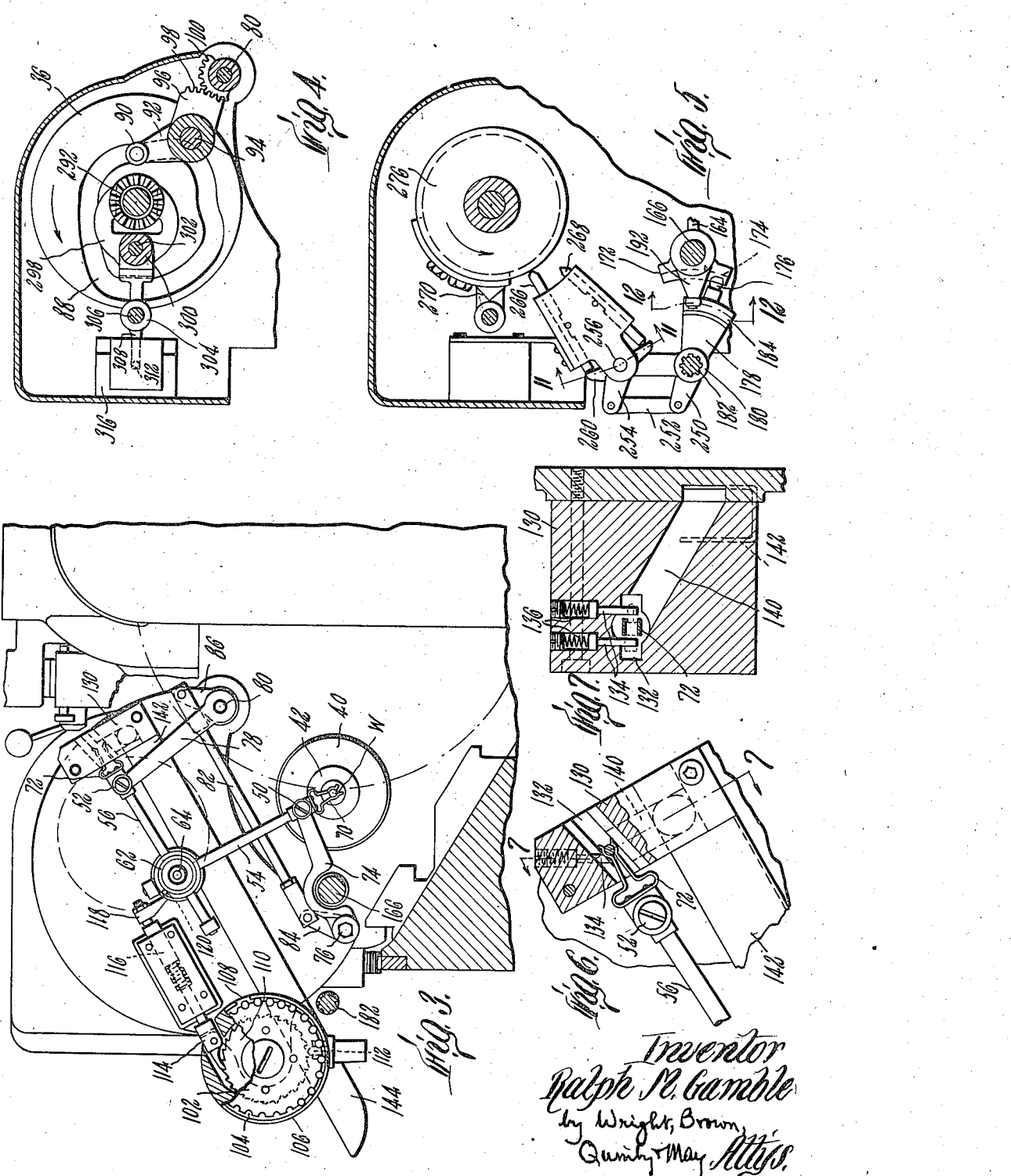

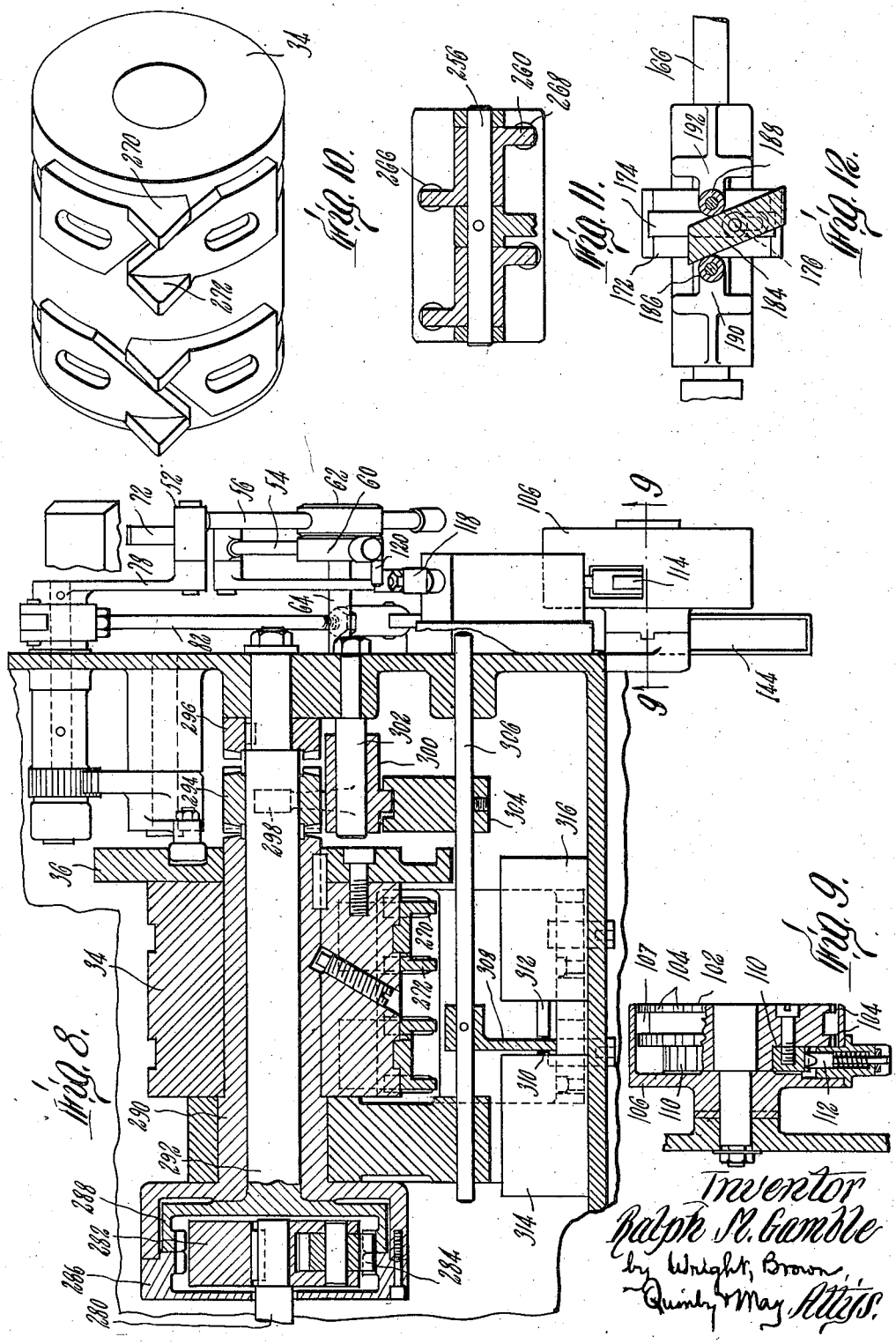

Nov. 30, 1948.  R. M. GAMBLE  2,454,916
MACHINE TOOL
Filed Feb. 18, 1946  4 Sheets-Sheet 4
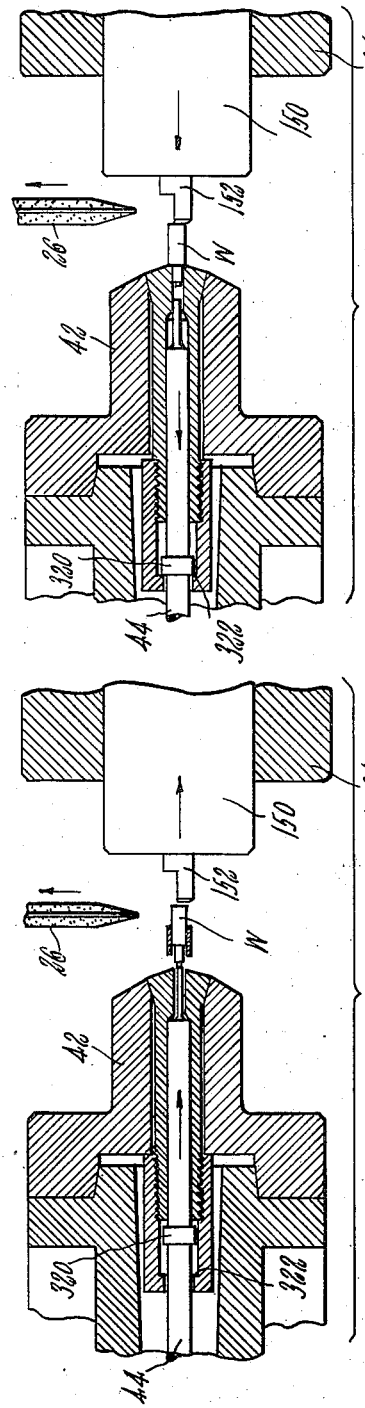
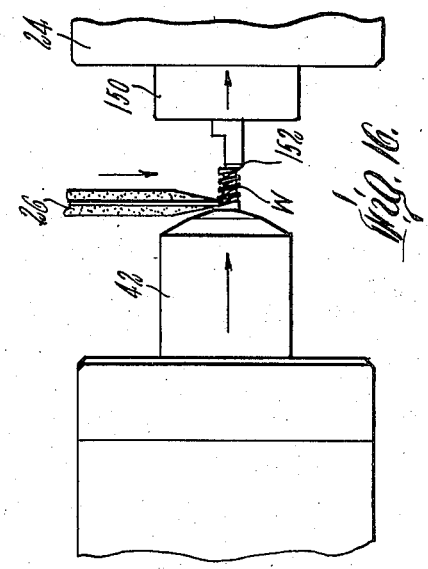
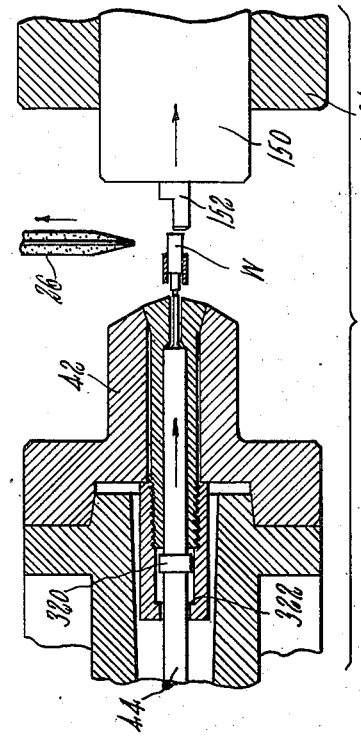
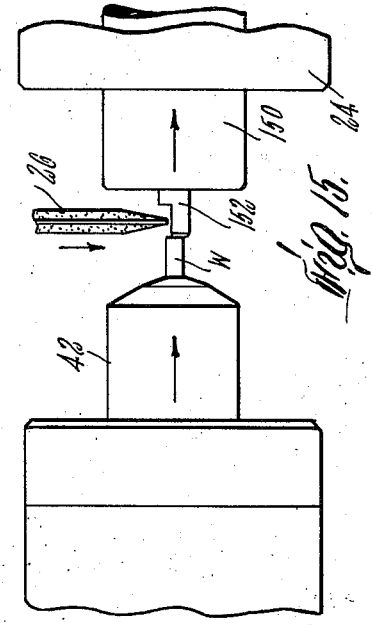
Inventor
Ralph M. Gamble
by Wright, Brown,
Quimby May Attys.

Patented Nov. 30, 1948

2,454,916

UNITED STATES PATENT OFFICE 2,454,916

MACHINE TOOL

Ralph M. Gamble, Springfield, Vt., assignor to Jones & Lamson Machine Company, Springfield, Vt., a corporation of Vermont Application February 18, 1946, Serial No. 648,423

8 Claims. (Cl. 51—215)

This invention relates to improvements in automatic machines for operating on work pieces, such for example as thread grinding machines. The invention is hereinafter described as embodied in a machine in which work pieces are automatically fed into and out of the machine and are automatically chucked prior to the tooling operation.

It is an object of the invention to speed up production by rapid automatic movements of mechanisms for feeding and chucking work pieces.

It is a further object of the invention to reduce the amount of supervision required for the operations of the machine.

According to the invention, transfer mechanism is provided to take the work pieces one by one from a magazine or source of supply and transfer such work pieces to a loading station in the machine in line with the spindle. As each work piece is carried from the magazine to the loading station, the preceding work piece on which the tooling operation has been completed is simultaneously transferred from the loading station to a discharge or receiving station.

Mechanism is also provided for pushing the fresh work piece from the transfer device to the chuck where it is automatically gripped by the chuck, the chuck being operated by mechanism in predetermined timed relation with the movements of the pushing mechanism. At the end of the tooling operation, the finished piece is discharged from the chuck to the transfer mechanism by which it is transferred to the discharge station.

For a more complete understanding of the invention, reference may be had to the following description of an embodiment thereof and to the drawings, of which:

Figure 1 is a front elevation of the upper portion of a grinding machine embodying the invention;

Figure 2 is a fragmentary section on the line 2—2 of Figure 1;

Figure 3 is a section on the line 3—3 of Figure 1;

Figure 4 is a section on the line 4—4 of Figure 1;

Figure 5 is a section on the line 5—5 of Figure 1;

Figure 6 is a detailed view of the discharge station shown in Figure 3, a portion being broken away to show in section;

Figure 7 is a section on the line 7—7 of Figure 6;

Figure 8 is a section on the line 8—8 of Figure 1;

Figure 9 is a section on the line 9—9 of Figure 8;

Figure 10 is a perspective view of a cam drum shown in Figure 8;

Figure 11 is a section on the line 11—11 of Figure 5;

Figure 12 is a section on the line 12—12 of Figure 5;

Figure 13 is a fragmentary sectional view on a horizontal plane of the chuck and spindle, showing the relation thereto of the ram, work piece and carrier fingers, and grinding wheel;

Figure 14 is a view similar to Figure 13 but showing the parts in a different position of operation;

Figures 15 and 16 are plane views of the parts shown in Figure 14, at different stages of operation.

The grinding machine embodying the present invention is preferably of the kind described and illustrated in U. S. Patent No. 2,187,227 granted to Ralph E. Flanders, January 16, 1940. The upper portion of such a machine is illustrated in Figure 1, and comprises a main frame or bed 20 on which is mounted a headstock 22 and a tailstock 24. Between the headstock and the tailstock is located a grinding wheel 26 housed in the semi-cylindrical wheelhead 28. The wheel is carried in a frame 30 which is angularly adjustable for different lead angles in the threads to be cut by the wheel in the work. On the headstock an electric motor 32 is mounted to drive a cam drum 34 and a cam disc 36 by which the operations of the chucking mechanism and the transfer mechanism are controlled in timed relation as hereinafter described. The headstock 22 also carries a rotatable spindle 40 within which is a chuck 42 operated by an ejector rod 44, the ejector rod being moved in one direction to close the chuck and in the other direction to open the chuck and eject the work.

The transfer mechanism is illustrated in Figure 3 and comprises two carrier heads 50 and 52 which are mounted respectively on the ends of two slide rods 54 and 56 which slide through hub members 60 and 62 respectively (Figure 8), these hub members being rockable on a stub shaft 64 projecting horizontally from the headstock 22. The carrier head 50 is provided with a pair of fingers 70 which may be of spring metal shaped to grasp a work piece W, the ends of the fingers being flared so that they can be pushed against a work piece so as to snap over its periphery and grip the work piece resiliently. In like manner the carrier head 52 is provided with a pair of spring fingers 72 adapted to grab and grip a work piece resiliently. The carrier head 50 is arranged to move through a path by which the fingers 70 transfer work pieces one by one from a supply station to a loading station in line with the chuck 42. The carrier head 52 is arranged for simultaneous movement with the carrier head 50, the former being made to follow a path from the loading station to a delivery station where the work pieces are stripped from the fingers 72. The carrier head 50 is actuated by an arm 74 which is pivoted at one end at 76 and at the other end to the carrier head 50. An arm 78 is pivoted at one end at 80 and at the other end to the carrier head 52 to actuate the latter. These arms are connected together for simultaneous movement by a connecting rod 82, the ends of which are connected to short arms 84 and 86 respectively which rock about axes 76 and 80 respectively and are secured to the arms 74 and 78. This linkage is actuated by rocking movement of the shaft 80 resulting from the rotation of the disc cam 36 (Figure 4) which is provided with a cam slot 88 in its face. In this slot rides a cam follower 90 on the end of a rock arm 92 which rocks about an axis 94. With the arm 92 rocks another arm 96 having a gear segment 98 on the end thereof, the gear segment meshing with a corresponding gear segment 100 mounted on the shaft 80. Thus the movements and positions of the carrier heads 50 and 52 are determined by the shape of the cam slot 88 as hereinafter described in more detail.

As indicated in Figures 3 and 9, the work pieces may be mounted in a circular magazine 102, transverse grooves 104 being provided in the periphery to hold individual work pieces in spaced relation. The magazine is housed in a casing 106 having an opening 108 through which the fingers 70 of the carrier head 50 enter to seize a work piece for transfer to the loading station. The grooves or notches 104, as indicated in Figure 9, are intersected by a deep circumferential groove 107 which provides clearance for the ends of the fingers 70 when they enter the aperture 108 to sieze a work piece. In order to hold the magazine in successive positions in which one of the work pieces will be in registry with the opening 108, a ratchet drum 110 is mounted on the magazine, a spring detent 112 being provided to enter the spaces between successive teeth of the ratchet so as to hold the magazine releasably in any one of its positions in which a groove 104 is in registry with the opening 108. With each operation of the carrier mechanism the magazine is indexed to bring the next successive work piece into registry with the opening 108. This is done by a pawl 114 mounted on a plunger 116 which carries at its opposite end a dog 118 engaged by a pin 120 whenever the carrier mechanism operates. As shown in Figure 8, the pin 120 may be carried by the hub member 60 so that when the hub member is rocked, the pin will press against the dog 118 so as to move the pawl 114 to advance the magazine sufficiently to bring the next successive work piece to the opening 108 where it can be seized by the fingers 70.

The carrier head 52 is employed to seize work pieces which have been tooled and are ready for discharge from the grinder. The fingers 72 transfer finished work pieces from the loading station to a discharge station shown in Figures 6 and 7. At this station is a frame member 130 having a bore 132 therethrough. This bore is large enough to receive the fingers 72 with the work piece. A detent device is mounted in the member 130 and comprises a pair of plungers 134 projecting into the bore 132 and pressed in by springs 136. The plungers 134 are inclined with reference to the axis of the bore 132 so that when a work piece is thrust into the bore, it pushes the plungers back until the work piece passes, whereupon the plungers spring to their normal position and prevent the retraction of the work piece with the fingers 72 when the carrier head 52 starts on its reverse movement toward the loading station. When the work piece is stripped from the fingers 72, it falls down through a passage 140 in the member 130 and enters an inclined chute 142 down which it slides to the lower end 144 where it can be removed as desired or can be discharged into a suitable container (not shown).

When a work piece has been transferred from the magazine to the loading station in line with the chuck 42, it is thereupon pushed into the chuck so as to be gripped thereby. For this purpose an axially slidable ram 150 is mounted on the tail stock 24, this ram having at one end an abutment element 152 adapted to bear against the end of the work piece held in the loading position and to push a work piece into the chuck. At the other end of the ram a rod 154 projects axially and extends through an arm 156, the extremity of the rod 154 having one or more nuts 158 threaded thereon. Between the ram 150 and the arm 156 is a nut 160 which is spaced from the arm 156, a spring 162 being located on the rod between the nut 160 and the arm 156. As result of this arrangement, movement of the arm 156 toward the right, as seen in Figure 2, pulls the ram to the right with it. Movement of the arm 156 to the left pushes the ram resiliently through the compressed spring 162. Thus, if the ram encounters sufficient resistance to its motion toward the left it can stop, any additional movement of the arm 156 in that direction being absorbed by the spring 162. The arm 156 projects from a casting 164 which is slidably mounted on a tie rod 166, the tie rod extending the entire width of the machine and being axially movable. The casting 164 is supported partly by the tie rod 166 and partly by a short stub shaft 168 which extends through a wall of the main frame and is slidable therein.

Cam apparatus for causing a small amount of relative movement between the casting 164 and the tie rod 166 in a direction parallel to the axis of the spindle is provided as illustrated in Figures 2, 5, and 12. For this purpose, a collar 170 is fixed on the tie rod 166. This collar has an arcuate extension 172 with the cam slot 174 therein. A cam follower 176 rides in slot 174, the cam follower 176 being mounted on an arm 178 which projects radially from a sleeve 180 splined on a shaft 182. The arm 178, in addition to the cam follower 176, also carries a cam block 184 which, as indicated in Figure 12, has parallel inclined faces. Against these faces are cam followers 186 and 188 which are mounted on horns 190 and 192, these horns being integral with the casting 164. From Figures 2 and 12 it is evident that if the splined sleeve 180 is rocked, the resulting motion of the cam 184 will shift the casting 164 to the right or to the left according to the direction of the rocking movement of the sleeve 180. At the same time the engagement of the cam follower 176 on the end of the arm 178 in the slot 174 will prevent relative axial movement between the sleeve 180 and the tie rod 166. Hence, if the tie rod 166 is not free to move axially at such time, the casting 164 will move in a direction parallel to the spindle axis and this motion of the casting 164 will result in a corresponding motion of the ram 150. It is thus evident that rocking movement of the splined shaft 182 which carries the sleeve 180 will result in axial movement of the ram 150, assuming that the tie rod 166 is held against axial movement.

A similar structure is employed at the other end of the machine for the axial actuation of the ejector rod 44 by which the chuck 42 is closed to grip a work piece or is opened to release a work piece. As shown in Figure 2, the ejector rod passes through and is secured to an arm 194 which projects from a casting 196 slidable on the tie rod 166. Fixed on the tie rod is a collar 198 having an extension 200 with a cam slot 202 in which rides a cam follower 204 on the end of the arm 206 which projects from a splined sleeve 208 slidably mounted on a splined shaft 210. The shaft 210 is aligned with the shaft 182 but these two shafts rock independently. The arm 206 has a cam block 212 similar to the cam block 184. On the inclined parallel faces of this cam block ride a pair of cam followers 214 and 216 which are mounted on horns 218 and 220 of the casting 196. Thus, rocking movements of the shaft 210 result in axial movements of the ejector rod 44 in one direction or the other, assuming that the tie rod 166 is at such times held against axial movement. Fixed on the tie rod 166 is a collar 222 having an arm 224 projecting therefrom with a groove in the end in which is received a flange 226 on the spindle 40. It is evident that if the spindle is stationary, the tie rod 166 will be held thereby against axial movement. If, however, the spindle moves axially, it will carry the tie rod 166 along with it. The tie rod in turn will carry with it the castings 196 and 164, the splined sleeves 208 and 180, and the members which are attached to the castings, namely the ejector rod 44 and the ram 150, assuming that at such times no rocking movement is being imparted to the shafts 210 and 182. It is thus evident that by rocking the shafts 210 and 182, axial movements of the ram 150 and the ejector rod 44 relative to the spindle are produced for the purpose of pushing a work piece into the chuck and closing the chuck thereon. When the work piece has been gripped by the chuck, the axial movement of the spindle itself carries all the other associated members therewith so that the grip of the chuck upon the work is not disturbed. Axial movement of the spindle 40 is obtained by a lead screw 230 which is splined to an extension of the spindle and which is in threaded engagement with a fixed nut 240 mounted in a wall of the headstock. The lead screw 230 determines the pitch of the screw thread to be cut on the work piece. This lead screw and the nut 240 can readily be replaced when a thread of a different pitch is to be cut on the work. The spindle is rotated by any suitable means such as a gear wheel 242 mounted on the spindle and meshing with an elongated pinion 244 on a drive shaft 246. As the spindle is rotated, the lead screw 230 causes axial movement of the spindle at the proper rate to carry the work piece past the edge of the grinding wheel for the grinding of a screw thread thereon.

Rocking movements of the individual splined shafts 210 and 182 are controlled by suitable apparatus such as that shown in Figures 1, 5, 10, and 11. Referring to Figure 5, the shaft 182 has an arm 250 projecting therefrom, this arm being connected by a link 252 to a parallel arm 254 rockable on a short shaft 256. Rockable with the arm 254 is a rocker 260 which is actuated by a pair of plungers 266 and 268. The other ends of these plungers ride on cams 270 and 272 adjustably mounted on the drum 34. As the drum 34 revolves, the rockers 260 are actuated in suitable sequence so as to impart rocking movements to the splined shafts 210 and 184.

The cams are so adjusted that the ram 150 pushes the work piece into the chuck immediately after the transfer fingers have brought the work piece from the magazine to the loading station. The ejector rod 44 is at once retracted to close the chuck on the work piece. The rotation of the drum 34 is thereupon stopped and the rotation of the spindle is commenced for the grinding operation. At the conclusion of the grinding operation, the spindle is stopped and the rotation of the cam drum is resumed for the purpose of ejecting the work from the chuck into the carrier fingers 72 which have been moved into the loading station by the rotation of the cam disc 36.

Means for intermittent rotation of the drum 34 is shown in Figure 8. A drive shaft 280 is constantly driven by the motor 32. Mounted on this drive shaft is a wheel 282 having a planetary pinion 284 mounted thereon so that teeth of the pinion project beyond the periphery of the wheel 282. These teeth mesh with the internal teeth of a ring gear 286 and a second ring gear 288, the numbers of teeth of these gears being different by one or two so that for each revolution of the shaft 280 there is relative movement between the ring gears 286 and 288 and an angular distance represented by the one or two teeth by which they differ. Hence, if either ring gear is held against rotation, the other rotates at a relatively slow speed. The ring gear 286 is mounted on the end of a tubular shaft 290 to which is fixed the cam drum 34 and the cam disc 36. The ring gear 288 is mounted on the end of a shaft 292 which is coaxial with the hollow shaft 290 and which is freely rotatable unless held as hereinafter described. When the shaft 292 is allowed to rotate, the shaft 290 is held motionless by a clutch mechanism comprising a sleeve 294 loosely mounted on the shaft 292. This sleeve has teeth at both ends for engagement alternately with corresponding teeth on the hollow shaft 290 or with corresponding teeth on a collar 296 which is splined or keyed on the shaft 292. The sleeve 294 is held against rotation so that when its teeth are meshed with those of the shaft 290, it holds the shaft 290 against rotation while permitting the shaft 292 to rotate. When it is meshed with the collar 296, it holds the shaft 292 stationary while the shaft 290 is permitted to rotate. The sleeve 294 is held against rotation by the arms of a fork 298 which engage in parallel segmental slots in its periphery. The arms of the fork 298 project from a hub portion 300 which is slidable on a stub shaft 302. The fork 298 is fixed by a block 304 mounted on a rod 306. This rod has an arm 308 projecting therefrom, a portion of the arm being in the path of opposed plungers 310 and 312 which are actuated by solenoids 314 and 316. Thus, when the solenoids shift the fork 298 in one direction the shaft 290 is held against rotation so that there is then no movement of the cam drum 34 or of the cam disc 36. A shift of the fork 298 in the opposite direction results in rotation of the cam drum and cam disc. This in turn resulting in actuation of the transfer mechanism and the chucking mechanism in timed relation to eject a work piece from the chuck, transfer such piece to the delivery station, introduce a fresh work piece to the loading station, push this work piece into the chuck, and close the chuck upon this work piece.

As illustrated in Figures 13 and 14, the chuck 42 is closed by engagement of a collar 320 on the ejector rod 44 with a shoulder 322 at the rear end of the chuck. Movement of the ejector rod 44 toward the right results in displacement of the chuck in the same direction to open the chuck and also results in the ejection of the work piece from the chuck to the waiting carrier fingers 12.

The machine operates as follows. At the conclusion of a grinding operation, the grinding wheel is withdrawn from the work by means not shown herein but described and illustrated in said Patent No. 2,187,227. The solenoid 310 is then energized to shift the clutch member 296 and thus to start the rotation of the cam drum 34 and disc 36. The latter acts through the cam follower 90 and the gear segments 98 and 100 to rock the shaft 80 so that the work-gripping fingers 70 and 72 move from intermediate positions of rest to the magazine opening 108 and loading station respectively. At the magazine opening the fingers 70 grasp a fresh work piece to be operated on. At the loading station, the fingers 72 snap on to the finished work piece which is still gripped by the chuck jaws. While the fingers remain stationary in these positions, cams on the drum 34 operate to rock the shaft 210 (Figure 2) to shift the ejector rod to the right, whereby the work piece W is released from the chuck and is pushed clear of the jaws (Figure 13), this work piece being embraced by the fingers 72. At the same time, another cam on the drum 34 acts to retract the ram 150 to the right. Continued rotation of the cam 34 and disc 36 causes the transfer mechanism to move to the position illustrated in Figure 3, the fingers 72 delivering the finished work piece to the discharge station while the fingers 70 bring a fresh work piece from the magazine to the loading station. Cams on the drum 34 then cause the shafts 182 and 210 (Figure 2) to rock, moving the ram 150 to the left to push the work piece into the chuck jaws and retracting the ejector rod to close the jaws on the work piece. The cam on the disc 36 then moves the fingers 70 and 72 to their idle positions, whereupon the solenoid 316 is energized to stop the rotation of the cam drum 34 and disc 36. The grinding wheel is brought up to engage the work piece and the grinding operation proceeds while the drum 34 is stopped. At the conclusion of the grinding operation, the wheel is withdrawn again, the rotation of the drum 34 and the disc 36 is resumed, and the next cycle begins.

I claim:

1. In a screw threading machine, a frame, a tool on said frame, a spindle rotatably mounted and axially movable on said frame, a chuck within said spindle, a ram axially movable on said frame in alignment with said spindle, cam actuated means for moving said ram to push a work piece to said chuck, automatic means for causing said chuck to grip a work piece pushed thereto, and means for axially moving said spindle and ram as a unit while the tool is in operative engagement with the work piece.

2. In a screw threading machine, a frame, a tool on said frame, a spindle rotatably mounted and axially movable on said frame, a chuck within said spindle, a ram axially movable on said frame in alignment with said spindle, cam actuated means for moving said ram to push a work piece to said chuck, an ejector rod within said spindle movable in one direction to close said chuck and in the other direction to open the chuck and eject the work piece therein, cam actuated means for operating said ejector rod, and means for axially moving the spindle, ram and ejector rod as a unit for operative engagement of the tool with the work.

3. In a screw threading machine having a receiving station, a frame, a tool mounted on said frame, a rotatable and axially movable spindle mounted on said frame, a chuck within said spindle, means for transferring a work piece from said receiving station to a position in line with and adjacent to said spindle, automatic means for pushing a work piece from said position to said chuck, means for closing and opening said chuck to grip and release a work piece, means including a fixed nut on said frame and a lead screw fixed on said spindle and in threaded engagement with said nut to advance the spindle as it rotates for operative engagement of the tool with the work, and means for causing said chuck operating means and work pushing means to advance as a unit with the spindle.

4. In a screw threading machine, a frame, a tool mounted on said frame, a spindle rotatable and axially movable on said frame, a chuck within said spindle, an axially movable member within said chuck to open and close the chuck, means connecting said spindle and said member for axial movement together as a unit, said means including elements relatively movable to cause axial movements of said member relative to said spindle to close and open said chuck.

5. In a screw threading machine, a frame, a tool on said frame, a spindle rotatable and axially movable on said frame, an axially slidable rod parallel to said spindle and connected thereto for axial movement in step therewith, a chuck within said spindle, an ejector member coaxial with said spindle and movable relatively thereto to close and open the chuck, and cam means movable as a unit with said spindle and ejector member and rockable to cause relative movement between said spindle and ejector member, said cam means including an element slidable on said rod and secured to said ejector member, and a rockable member operatively connecting said rod and element and normally holding said rod and element against relative axial movement, said rockable member having cam surfaces arranged to cause relative axial movement of the element and rod when said rockable member is rocked.

6. In a screw threading machine, a frame, a tool on said frame, a spindle rotatable and axially movable on said frame, a chuck within said spindle, a ram aligned with said spindle and axially movable to push a work piece to said chuck, and a cam member axially movable as a unit with said spindle and said ram and rockable to cause relative axial movement between said spindle and said ram.

7. In a screw threading machine, a frame, a spindle rotatable and axially movable on said frame, a chuck in said spindle, a supply magazine spaced from said spindle, a discharge hopper, means for simultaneously transferring a work piece from said magazine to a loading position in line with said chuck and another work piece from said loading position to said hopper, means at said hopper for stripping from said transfer means work pieces brought thereby to said hopper, a ram aligned with said spindle and movable relatively thereto to push a work piece from the loading position to the chuck, means for actuating said ram, means for closing said chuck on a work piece and subsequently ejecting the work piece from the chuck to the loading position, means for advancing said spindle and ram as a unit during the tooling of the work, and means for automatically operating all said means in timed sequence.

8. In an automatic machine for operating on a work piece, a frame, a tool carried by said frame, a spindle rotatably mounted and axially movable on said frame, a chuck in said spindle, a ram aligned with said chuck and axially movable relatively to the chuck to press a work piece into said chuck, axially movable means in said chuck to close and open the chuck, automatic means for moving said ram toward and from said chuck, and means for moving the spindle, ram and chuck actuating means axially as a unit to cause axial movement of the work piece relative to the frame.

RALPH M. GAMBLE

REFERENCES CITED

The following references are of record in the file of this patent:

UNITED STATES PATENTS

| Number | Name | Date |
| --- | --- | --- |
| 1,310,386 | Bock | July 15, 1919 |
| 1,862,042 | Stevens | June 7, 1932 |